Patented Oct. 12, 1943

2,331,869

UNITED STATES PATENT OFFICE 2,331,869

MANUFACTURE OF HIGH POLYMERS OF ALLYL TYPE HALIDES

David E. Adelson and Hans Dannenberg, Berkeley, Calif., assignors to Shell Development Company, San Francisco, Calif., a corporation of Delaware No Drawing. Application October 30, 1941, Serial No. 417,140

10 Claims. (Cl. 260—80)

This invention relates to a process for the manufacture of polymers of high molecular weight from mono-olefinic allyl type mono-halides. More particularly, the invention is concerned with a method of preparing high polymers of vinylidene carbinyl halides and, specifically, the invention pertains to an improved method for obtaining high molecular weight polymers of beta-methyl allyl chloride.

H. Staudinger and T. Fleitmann in Ann. 480, 92–108 (1930) describe a method of producing polyallyl chloride. The method used by them consisted of subjecting allyl chloride to the catalytic action of sunlight or ultraviolet light. This method, while interesting, is of little practical importance since they show that weeks or months are required to obtain polyallyl chloride. It is apparent that such a method is unsuited for manufacture of polyallyl chloride on a commercial scale because of the very long elapse of time required to obtain the polymer.

It is an object of the present invention to provide a practical and economically attractive method of polymerizing allyl chloride. Another object is to provide a method of manufacturing high polymers from vinylidene carbinyl halides. A further object is to provide a process for polymerizing mono-olefinic allyl type mono-halides. An additional object is to provide an improved method for producing the peculiarly useful high polymers of beta-hydrocarbon substituted allyl halides and, in particular, high polymers of beta-methyl allyl chloride. These and other objects will be apparent from the description of the invention given hereinafter.

The process of the invention comprises subjecting a mono-olefinic allyl type mono-halide to the action of boron trifluoride at low temperatures and under substantially anhydrous conditions. This treatment affords a comparatively fast and economical method of converting the halide to a high molecular weight polymer. The rate of polymerization as well as the yield of polymer may be further increased by effecting the polymerization in the presence of a heavy metal which promotes the catalytic activity of the boron trifluoride.

The reactants employed in the process of the invention are termed broadly "mono-olefinic allyl type mono-halides." By this expression is meant compounds which contain the essential grouping of atoms which may be represented as

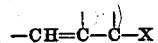

wherein X represents a halogen atom. Further, these compounds contain only one olefinic group of which one of the unsaturated carbon atoms contains at least one hydrogen atom directly linked thereto and only one halogen atom per molecule. Representative examples of mono-olefinic allyl type mono-halides are such compounds as allyl chloride, allyl bromide, crotyl chloride, crotyl iodide, beta-methylallyl chloride, beta-methylallyl bromide, methyl vinyl carbinyl chloride, methyl vinyl carbinyl fluoride, alpha-dimethylallyl chloride, beta-cyclohexylallyl chloride, cinnamyl chloride, beta-ethylcrotyl chloride and the like. A preferred group of compounds consists of mono-olefinic allyl type halides containing an unsaturated tertiary carbon atom linked directly to the carbinyl group to which the halogen atom is directly linked, as in such compounds as beta-methylallyl chloride, beta-methylcrotyl chloride, methyl isopropenyl bromide, beta-phenylcrotyl chloride, beta-cyclopentylallyl chloride and the like. The compounds containing a vinylidene group directly linked to the carbinyl group linked directly to the halogen atom constitute a particularly preferred group of reactants. Compounds of the class include allyl chloride, beta-methylallyl chloride, methyl vinyl carbinyl chloride, beta-phenylallyl bromide, alpha-dicyclohexylallyl chloride and the like. The most preferred group of compounds are the beta-hydrocarbon substituted allyl halides, such as beta-methylallyl chloride, beta-methylallyl bromide, beta-propylallyl iodide, beta-phenylallyl chloride, beta-cyclohexylallyl fluoride and the like.

The unsaturated organic halide is polymerized by subjecting it to the action of boron trifluoride, preferably at temperatures not greater than room temperature, i. e. about 25° C. The boron trifluoride is brought into intimate contact with the unsaturated halide at a temperature below room temperature, but not at a temperature so low that the unsaturated halide is in the solid state. In many cases, very low temperatures may be used, such as from —50 to —80° C., while in others the physical properties of the reactant will not permit operation at such temperatures. The preparation of high polymers is favored with operation at low temperatures. After mixing the catalyst with the reactant at low temperature, heating of the mixture to room temperature is sometimes to be preferred. The low temperatures are conveniently obtained with the use of dry ice or solid carbon dioxide.

The process of the invention is effected with the reactant undergoing polymerization in the liquid phase. Many of the lower unsaturated halides have very low solidification temperatures and they are maintained in the liquid phase at low temperatures when polymerized. However, higher members of the reactant series have inherently higher solidifying temperatures. In order to keep such materials in the liquid phase when undergoing the polymerization reaction, they may be dissolved in a suitable inert solvent whereby the solution is liquid at the low temperature of operation of the process. Suitable inert solvents include the butanes, pentanes, hexanes, heptanes, halogenated lower paraffinic hydrocarbons and the like.

While the boron trifluoride permits the unsaturated halides to be polymerized to high polymer in much less time than light alone, the action of the catalyst is further increased in the presence of a metal catalyst promoter. Particularly favorable results are obtained with substances known as metal hydrogenation catalysts. We have found that such substances which are designed for use as hydrogenation catalysts are especially suitable for promoting the polymerizing action of boron trifluoride in the process of the invention. These materials are usually in a comminuted state and specific examples of suitable metals include copper, platinum, palladium, iron, nickel, cobalt and the like. A metal promoter especially suited for use in the process is Raney nickel prepared according to the description given in Raney, U. S. Patent No. 1,628,190.

The process of the invention is executed under substantially anhydrous conditions. It is, of course, impossible to have the reaction mixture absolutely dry and free of water, but no more than a trace of water is permitted to be present. When water is present in the reaction mixture, this water hydrolyzes the boron trifluoride catalyst and generates hydrofluoric acid which is undesirable. The hydrofluoric acid generated by the water attacks and disintegrates the metal catalyst promoters. It is consequently necessary that the reaction mixture be maintained substantially anhydrous during the course of the polymerization.

The polymers may be recovered from the reaction mixture in a variety of manners. Ordinarily all of the unsaturated halide is not converted to polymer by the polymerization reactions. The unreacted monomeric halide and lower polymers may be recovered from the reaction mixture by distillation, in vacuo if desired, or by evaporation, leaving the desired higher polymers or residue which is non-volatile at ordinary temperatures. A preferred method of separating the high polymers involves dissolving the crude reaction mixture in a suitable solvent for both the monomer and polymers and then adding a non-solvent for the high polymers, whereby the high polymers are precipitated. The lower ketones like acetone, methyl ethyl ketone and the like, are suitable solvents for the entire reaction mass, while water or lower alcohols like methyl alcohol, ethyl alcohol, isopropyl alcohol, function as non-solvents which will precipitate the high polymers from the mixture. The separated high polymers may be freed of small quantities of solvents and nonsolvents by evaporation. In some cases, the unreacted halide is first removed from the reaction mixture by distillation or evaporation and the high polymers subsequently separated by the solution-precipitation operation from the lower polymers.

The high polymers obtained by polymerizing a mono-olefinic beta-hydrocarbon substituted allyl mono-halide are particularly useful substances with unique and unexpected properties. These high polymers contain the structure of at least four monomeric units of the unsaturated halide linked together to form the polymer and have the property of being exceptionally sticky or tacky, which is of value. Similar halides from allyl halides devoid of beta-substituents do not possess such sticky properties. For example, the polymer from beta-methylallyl chloride containing at least four monomeric units linked together is a very sticky substance. Apparently, the stickiness of the polymer is dependent upon the ability of the polymer to wet and cling to surfaces coupled with its viscous and ductile character. A like polymer from allyl chloride, on the other hand, is of markedly different character in not being appreciably sticky. The sticky character of the four-unit or higher polymer from a mono-olefinic beta-hydrocarbon substituted allyl mono-halide makes the polymers particularly applicable for adhesive purposes. Polymers of less than four units do not have sufficient chain length to possess the necessary stickiness for most adhesive applications, and for this purpose it is usually preferable that the polymer contain at least eight units.

Further, the property of the polymers of being non-volatile makes them desirable for use in special applications. Their non-volatile property coupled with their fireproofing property makes them useful for impregnating wood and like materials. As plasticizers for resins and other plastic materials, their excellent retention in the plastic compositions is due to their being non-volatile so that the compositions retain the original plastic properties over extended periods of time.

The following examples are given for the purpose of further illustrating the invention:

Example I

About 10 gms. of beta-methylallyl chloride were treated with a slow stream of boron trifluoride at a temperature between $-60°$ C. and $-70°$ C. during 1½ hours. After discontinuation of the gas stream, the mixture was stored overnight at a temperature of a dry ice-acetone mixture. Then the reaction vessel was removed from the cold bath and air was blown through the reaction vessel to remove the boron trifluoride. The polymer was isolated by evaporating unreacted chloride, dissolving the residue in acetone and precipitating the polymer from the solution with methyl alcohol and water. The polymer obtained was a non-volatile, sticky, yellow, syrupy substance.

Analysis of the product gave the following results.

Carbon, per cent _____ 54.3
    Theoretical for $(C_4H_7Cl)_x$ _____ 53.0
Hydrogen, per cent _____ 8.0
    Theoretical for $(C_4H_7Cl)_x$ _____ 7.7
Refractive index, $N_D^{20}$ _____ 1.5296

Example II

About 23.4 gms. of beta-methylallyl chloride were treated with a slow stream of boron trifluoride at $-75°$ C. with agitation during 30 minutes. The reaction vessel and contents were maintained at $-60°$ to $-75°$ C. for 60 hours and then permitted to heat up to room temperature after which they were stored for five days. The product obtained was purified by twice dissolving in acetone, precipitating the polymer with water, and drying at 50° C. in vacuo. About 21.3 gms. (91 per cent yield) of polymer were obtained which was a non-volatile, very sticky, syrupy product which had a molecular weight of about 640, indicating the polymer averaged about 7.1 monomeric units per molecule.

*Example III*

About 182 gms. of allyl chloride were stirred with 4.5 gms. Raney nickel (added as a suspension in 1 cc. of allyl chloride) for 1 hour at dry ice temperature while a stream of $BF_3$ was passed through the material. The mixture then stood for approximately 5 hours at dry ice temperature, after which it was heated to room temperature at which it remained for 5 days. The mixture was then washed twice with water, once with dilute sodium bicarbonate solution, followed with an additional washing with water. About 58 gms. of material were lost in the washing operation. About 123 gms. of the polymer solution were distilled first at atmospheric pressure and then under high vacuo. There were obtained about 58.6 gms. of pure allyl chloride ($n_D^{20}=1.415$), 17.8 gms. of allyl chloride and dimer ($n_D^{20}=1.4205$) and 43.5 gms. of very viscous, dark brown polymer. The determination of the properties of the polymer yielded the following values:

| | |
|---|---|
| Carbon, per cent | 49.8 |
| Theoretical for $(C_3H_5Cl)_x$ | 47.1 |
| Hydrogen, per cent | 6.8 |
| Theoretical for $(C_3H_5Cl)_x$ | 6.6 |
| Chlorine, per cent | 43.3 |
| Theoretical for $(C_3H_5Cl)_x$ | 46.3 |
| Molecular weight | 360 |
| Refractive index, $n_D^{20}$ | 1.517 |

We claim as our invention:

1. In a process for the production of a polymer wherein beta-methallyl chloride is polymerized in the liquid phase in the presence of boron trifluoride under substantially anhydrous conditions at a temperature not greater than 25° C., the improvement which comprises effecting the polymerization in the presence of Raney nickel.

2. In a process for the production of a polymer wherein beta-methylallyl chloride is polymerized in the liquid phase in the presence of boron trifluoride under substantially anhydrous conditions at a temperature not greater than 25° C., the improvement which comprises effecting the polymerization in the presence of a comminuted metal of the group consisting of copper, platinum, palladium, iron, nickel and cobalt.

3. In a process for the production of a polymer wherein a beta-hydrocarbon-substituted allyl chloride containing not more than 6 carbon atoms in said hydrocarbon substituent is polymerized in the liquid phase in the presence of boron trifluoride under substantially anhydrous conditions at a temperature not greater than 25° C., the improvement which comprises effecting the polymerization in the presence of Raney nickel.

4. In a process for the production of a polymer wherein a beta-hydrocarbon-substituted allyl halide containing not more than 6 carbon atoms in said hydrocarbon substituent is polymerized in the liquid phase in the presence of boron trifluoride under substantially anhydrous conditions at a temperature not greater than 25° C., the improvement which comprises effecting the polymerization in the presence of a comminuted metal of the group consisting of copper, platinum, palladium, iron, nickel and cobalt.

5. In a process for the production of a polymer wherein a mono-olefinic halide containing an olefinic linkage between two carbon atoms, one of which is linked directly to a saturated carbon atom having the halogen atom linked directly thereto, said mono-olefinic halide containing not more than 15 carbon atoms, is polymerized in the liquid phase in the presence of boron trifluoride under substantially anhydrous conditions, the improvement which comprises effecting the polymerization in the presence of a comminuted metal from the group consisting of copper, platinum, palladium, iron, nickel and cobalt.

6. In a process for the production of a polymer wherein beta-methylallyl chloride is polymerized in the liquid phase in the presence of boron trifluoride under substantially anhydrous conditions at a temperature not greater than 25° C., the improvement which comprises effecting the polymerization in the presence of comminuted metallic nickel.

7. In a process for the production of a polymer wherein allyl chloride is polymerized in the liquid phase in the presence of boron trifluoride under substantially anhydrous conditions at a temperature not greater than 25° C., the improvement which comprises effecting the polymerization in the presence of comminuted metallic nickel.

8. In a process for the production of a polymer wherein allyl chloride is polymerized in the liquid phase in the presence of boron trifluoride under substantially anhydrous conditions at a temperature not greater than 25° C., the improvement which comprises effecting the polymerization in the presence of Raney nickel.

9. In a process for the production of a polymer wherein allyl chloride is polymerized in the liquid phase in the presence of boron trifluoride under substantially anhydrous conditions, the improvement which comprises effecting the polymerization in the presence of comminuted metallic palladium.

10. In a process for the production of a polymer wherein allyl chloride is polymerized in the liquid phase in the presence of boron trifluoride under substantially anhydrous conditions at a temperature not greater than 25° C., the improvement which comprises effecting the polymerization in the presence of comminuted metallic palladium.

DAVID E. ADELSON.
HANS DANNENBERG.